United States Patent
Yang et al.

(10) Patent No.: US 9,674,725 B2
(45) Date of Patent: Jun. 6, 2017

(54) METHOD AND TERMINAL FOR PERFORMING MEASUREMENTS IN COVERAGE EXTENSION AREA OF SMALL-SCALE CELL WHEN MACRO CELL AND SMALL-SCALE CELL COEXIST

(71) Applicant: LG ELECTRONICS INC., Seoul (KR)

(72) Inventors: Yoonoh Yang, Seoul (KR); Jinyup Hwang, Seoul (KR); Manyoung Jung, Seoul (KR); Sangwook Lee, Seoul (KR); Suhwan Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 98 days.

(21) Appl. No.: 14/438,095

(22) PCT Filed: Aug. 12, 2013

(86) PCT No.: PCT/KR2013/007228
§ 371 (c)(1),
(2) Date: Apr. 23, 2015

(87) PCT Pub. No.: WO2014/077489
PCT Pub. Date: May 22, 2014

(65) Prior Publication Data
US 2015/0296400 A1    Oct. 15, 2015

Related U.S. Application Data

(60) Provisional application No. 61/725,960, filed on Nov. 13, 2012.

(51) Int. Cl.
*H04W 24/10* (2009.01)
*H04W 16/32* (2009.01)
(Continued)

(52) U.S. Cl.
CPC ........... *H04W 24/10* (2013.01); *H04L 5/0048* (2013.01); *H04W 16/32* (2013.01); *H04W 24/00* (2013.01); *H04W 72/0446* (2013.01)

(58) Field of Classification Search
CPC ... H04W 24/10; H04W 84/105; H04B 17/318
See application file for complete search history.

(56) References Cited

U.S. PATENT DOCUMENTS

| | | | |
|---|---|---|---|
| 2011/0286346 A1* | 11/2011 | Barbieri | H04W 24/10 370/252 |
| 2011/0312358 A1 | 12/2011 | Barbieri et al. | |
| 2012/0082022 A1* | 4/2012 | Damnjanovic | H04W 24/10 370/201 |

FOREIGN PATENT DOCUMENTS

| | | |
|---|---|---|
| KR | 10-2012-0009913 | 2/2012 |
| KR | 10-2012-0070346 | 6/2012 |

(Continued)

OTHER PUBLICATIONS

PCT International Application No. PCT/KR2013/007228, Written Opinion of the International Searching Authority dated Nov. 27, 2013, 1 page.

*Primary Examiner* — Pao Sinkantarakorn
(74) *Attorney, Agent, or Firm* — Lee Hong Degerman Kang & Waimey

(57) ABSTRACT

The present specification provides a method for performing measurements, by a terminal, in a coverage extension area of a small-scale cell in a wireless communication system in which macro cell and the small-scale cell coexist. The method for performing measurements can include the steps of: receiving information about a first subframe on which measurements for the small-scale cell can be performed and information about a second subframe on which measurements for the macro cell can be performed; when an interference cancellation function is set, measuring reference (Continued)

signal received power (RSRP) and a received signal strength indicator (RSSI) for the small-scale cell by driving the interference cancellation function on the first subframe; and measuring RSRP on the second subframe for the macro cell by driving the interference cancellation function and measuring the RSSI for the macro cell without driving the interference cancellation function.

13 Claims, 17 Drawing Sheets

(51) Int. Cl.
  *H04W 24/00* (2009.01)
  *H04L 5/00* (2006.01)
  *H04W 72/04* (2009.01)

(56) References Cited

FOREIGN PATENT DOCUMENTS

| WO | 2011/122833 | 10/2011 |
|----|-------------|---------|
| WO | 2012/064589 | 5/2012  |

\* cited by examiner

METHOD AND TERMINAL FOR PERFORMING MEASUREMENTS IN COVERAGE EXTENSION AREA OF SMALL-SCALE CELL WHEN MACRO CELL AND SMALL-SCALE CELL COEXIST

CROSS-REFERENCE TO RELATED APPLICATIONS

This application is the National Stage filing under 35 U.S.C. 371 of International Application No. PCT/KR2013/007228, filed on Aug. 12, 2013, which claims the benefit of U.S. Provisional Application No. 61/725,960, filed on Nov. 13, 2012, the contents of which are all hereby incorporated by reference herein in their entirety.

BACKGROUND OF THE INVENTION

Field of the Invention

The present invention relates to a method and terminal for performing measurements in a coverage extension area of a small-scale cell when a macro cell and a small-scale cell coexist.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. To understand OFDMA, OFDM should be known. OFDM may attenuate inter-symbol interference with low complexity and is in use. OFDM converts data serially input into N parallel data pieces and carries the data pieces over N orthogonal sub-carriers. The sub-carriers maintain orthogonality in view of frequency. Meanwhile, OFDMA refers to a multiple access scheme that realizes multiple access by independently providing each user with some of sub-carriers available in the system that adopts OFDM as its modulation scheme.

Recently, 3GPP LTE-Advanced (LTE-A) which is an evolution of 3GPP LTE has been discussed.

In addition, a hetero-network in which a macro cell and a small-scale cell coexist has been discussed recently. Particularly, discussions have been progressed in order to detour traffic by dispersing terminals connected to a macro cell into a small-scale cell.

However, coverage of the small-scale cell is anticipated to be very narrow and it is highly probable that a plurality of terminals is located outside of the coverage of small-scale cell. Accordingly, the effort to disperse the traffic may be useless.

SUMMARY OF THE INVENTION

Accordingly, in an aspect, the present specification proposes methods which enable a terminal located outside of coverage of a small-scale cell to access the small-scale cell in an environment in which a macro cell and a small-scale cell coexist.

In addition, in another aspect, the present specification proposes a method and terminal for performing measurements in a coverage extension area of a small-scale cell when a macro cell and a small-scale cell coexist.

In order to achieve the above object, in accordance with an aspect of the present invention, there is provided a method for performing measurements in a wireless communication system in which a macro cell and a small cell coexist. The method may performed by a terminal in a coverage extension area of the small cell and comprise: receiving information of a first subframe in which the measurement for the small cell is to be performed and information of a second subframe in which the measurement for the macro cell is to be performed; measuring a reference signal received power (RSRP) and a received signal strength indicator (RSSI), by operating an interference cancellation function on the first subframe if the interference cancellation function is configured; and measuring the RSRP on the second subframe for the macro cell by operating the interference cancellation function, and measuring the RSSI by not operating the interference cancellation function.

The interference cancellation function may be an interference cancellation function for a cell-specific reference signal (CRS).

The method may further comprise: receiving information of a neighbor cell that causes interference and CRS information of a neighbor cell.

The performing the measurement by operating the interference cancellation function may include: removing interference due to the CRS from the corresponding neighbor cell by using the information of the neighbor cell and the CRS information of the neighbor cell.

The information of the neighbor cell and the CRS information of the neighbor cell may be received if the interference cancellation function is configured.

The information of the first subframe and the information of the second subframe may correspond to measSubframePatternPCell and measSubframePatternConfigNeigh, respectively.

If the small cell may be a serving cell and the macro cell may be a neighbor cell, the first subframe may be operated as a normal subframe, not an ABS subframe, by the small cell that corresponds to the serving cell. Also, the second subframe may be operated as the normal subframe, not the ABS subframe by the small cell that corresponds to the serving cell, while the second subframe may be operated as a normal subframe, not an ABS subframe, by also the macro cell that corresponds to the neighbor cell.

If the macro cell may be the serving cell and the small cell is the neighbor cell, the first subframe may be operated as a normal subframe, not an ABS subframe, by the macro cell that corresponds to the serving cell, while the subframe may be operated as a normal subframe, not an ABS subframe, by also the small cell that corresponds to the neighbor cell. Alternatively, the second subframe may be operated as an ABS subframe by the macro cell that corresponds to the serving cell, while the second subframe may be operated as a normal subframe, not an ABS subframe, by the small cell that corresponds to the neighbor cell.

In order to achieve the above object, in accordance with an aspect of the present invention, there is provided a terminal for performing measurements in a coverage extension area of a small cell in a wireless communication system in which a macro cell and a small cell coexist. The terminal may comprise: a RF unit configured to receive information of a first subframe in which the measurement for the small cell is to be performed and information of a second subframe in which the measurement for the macro cell is to be performed, wherein the RF unit includes an interference cancellation function; and a processor configured to control the RF unit and to measure a reference signal received power (RSRP) and a received signal strength indicator (RSSI) by operating the interference cancellation function on the first subframe, and to measure the RSRP on the second subframe for the macro cell by operating the interference cancellation function, wherein the RSSI is measured by not operating the interference cancellation function.

ADVANTAGEOUS EFFECTS

According to aspects of the present specification, a terminal is able to effectively perform measurements in a coverage extension area of a small-scale cell when a macro cell and a small-scale cell coexist.

DESCRIPTION OF EXEMPLARY EMBODIMENTS

Figure 1:
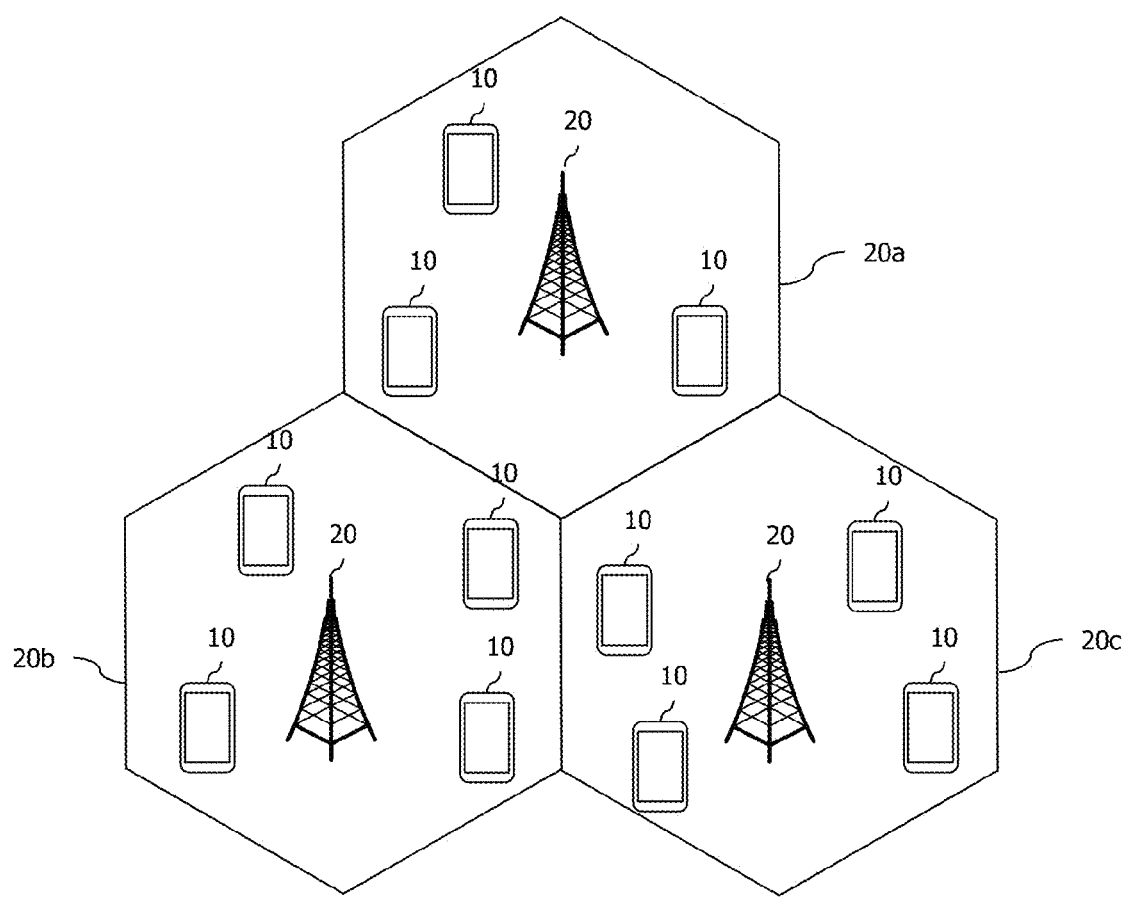
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 shows a wireless communication system.

As can be seen from FIG. 1, the wireless communication system includes at least one base station (BS) 20. Each base station 20 offers a communication service in a specific geographical area (generally denoted cell) 20a, 20b, and 20c. Each cell may be divided into a plurality of areas (which are called sectors). A user equipment (UE) 10 may be fixed or mobile and may be referred to by other names such as mobile station (MS), mobile user equipment (MT), user equipment (UT), subscriber station (SS), wireless device, personal digital assistant (PDA), wireless modem, handheld device. The BS 20 generally refers to a fixed station that communicates with the UE 10 and may be called by other names such as evolved-NodeB (eNB), base transceiver system (BTS), access point (AP), etc.

The terminal generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the terminal.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Figure 2:
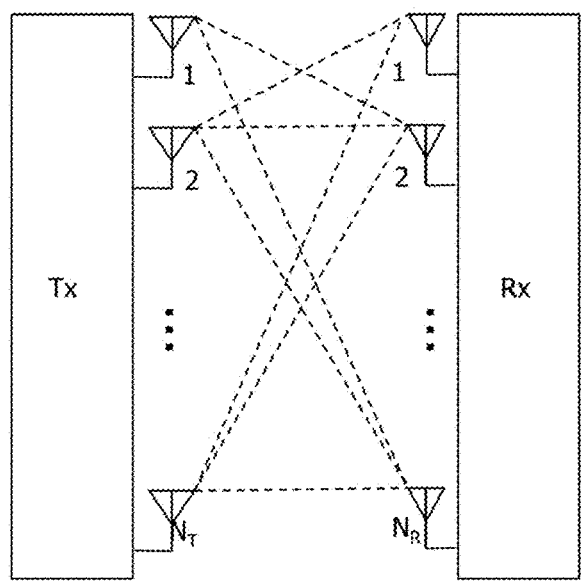
FIG. 2 illustrates a general multiple antenna system.

FIG. 2 illustrates a general multiple antenna system.

As shown in FIG. 2, when increasing the number of transmission antenna to $N_T$ and increasing the number of reception antenna to $N_R$ at the same time, a transmission rate can be increased and a frequency efficiency can be dramatically increased because a theoretical channel transmission capacity is increased in proportion to the number of antenna, unlike the case of using multiple antennas only in either one of transmitter or receiver.

The transmission rate due to the increase of channel transmission capacity may be theoretically increased by multiple of a maximum transmission rate $R_o$ in case of using an antenna and a rate increase $R_i$ as shown below. That is, for example, in the MIMO communication system that uses 4 transmission antennas and 4 reception antennas, the transmission rate may be increased 4 times in comparison with the single antenna system theoretically.

After the theoretical increase of capacity in such a multiple antenna system is proved in the middle of 1990', various technologies to induce the theoretical increase into actual increase of data transmission rate has been researched up to now, and a few of the technologies are already applied to various wireless communication standards such as third generation mobile communication and next generation wireless LAN, etc.

$$R_i = \min(N_T, N_R) \qquad \text{[Equation 1]}$$

The research trends in relation to the multiple antenna up to now show that researches have been vigorously progressed in various aspects such as a research in the aspect of information theory in relation to communication capacity calculation of multiple antenna in various channel environment and multiple access environment, researches of wireless channel measurement and modeling process of the multiple antenna system, and a research of space-time signal processing for increasing transmission reliability and transmission rate, etc.

In a user equipment structure having general MIMO channel environment, reception signals received in each reception antenna can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \qquad \text{[Equation 2]}$$

Herein, the channel between respective transmission and reception antennas may be distinguished based on transmission and reception index, and the channel passing from a transmission antenna j to a reception antenna i is represented as $h_{ij}$. In case of using precoding scheme like LTE when transmitting a signal, the transmission signal x can be expressed by Equation 3.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Equation 3]}$$

Herein, $w_{ij}$, a precoding matrix w means a weighting between a ith transmission antenna and jth information. In this time, if the transmission power of a respective signal to be transmitted is P1, P2, ..., PNT, a transmission information of which transmission power has been adjusted may be represented as a diagonal matrix P as follows.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, a wireless communication system may be divided into a frequency division duplex (FDD) method and a time division duplex (TDD) method. Based on the FDD method, an uplink transmission and a downlink transmission are progressed in different frequency bands. Based on the TDD method, the uplink transmission and the downlink transmission are performed in the same frequency band at different times. A channel response of a TDD method is actually reciprocal. This means the downlink channel response and the uplink channel response are almost same in the current frequency domain. Therefore, there is an advantage in that the downlink channel response in the wireless communication system based on the TDD may be obtained from the uplink channel response. In the TDD method, as the whole frequency domain is divided into an uplink transmission and a downlink transmission by time-share, it is not available to perform the downlink transmission by a terminal and the uplink transmission by a UE at the same time. In the TDD system in which an uplink transmission and a downlink transmission are divided by a subframe unit, the uplink transmission and the downlink transmission are performed in different subframes.

Hereinafter, the LTE system is described in further detail.

Figure 3:
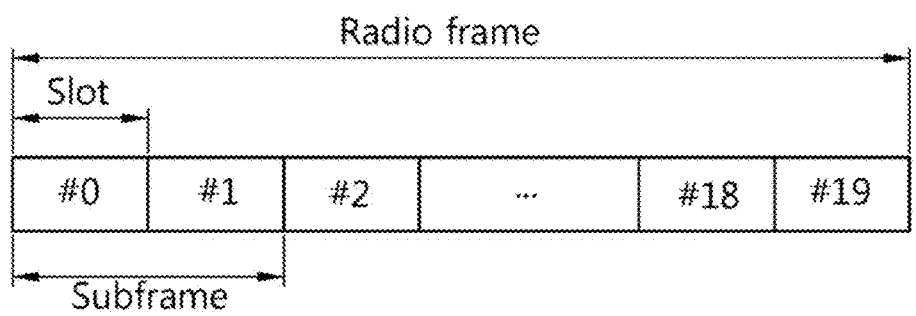
FIG. 3 illustrates the architecture of a radio frame according to FDD in 3GPP LTE.

FIG. 3 illustrates the architecture of a radio frame according to FDD in 3GPP LTE.

Referring to FIG. 3, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

Figure 4:
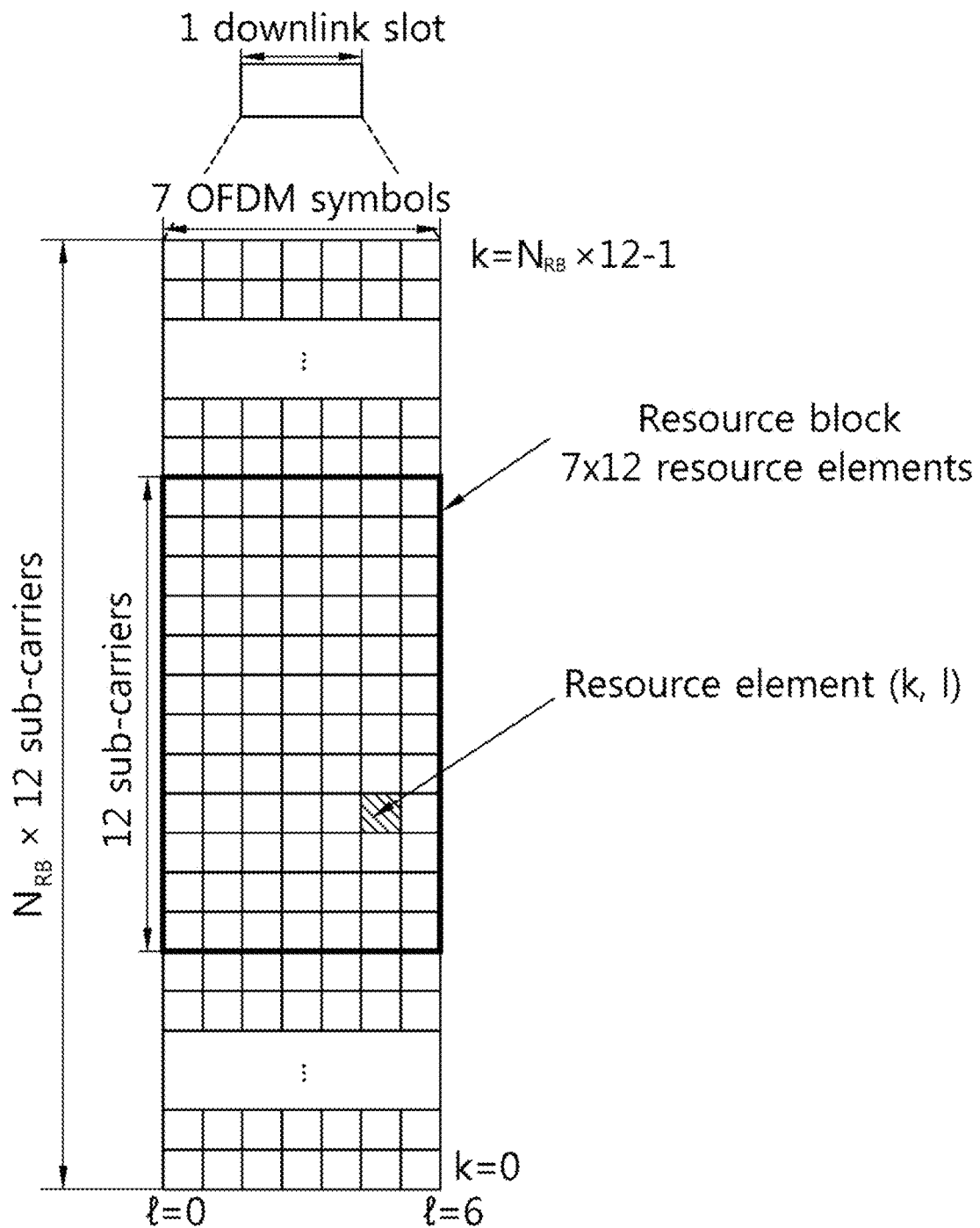
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NUL resource blocks (RBs) in the frequency domain. OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

In 3GPP LTE, the resource grid for one uplink slot shown in FIG. 4 may also apply to the resource grid for the downlink slot.

Figure 5:
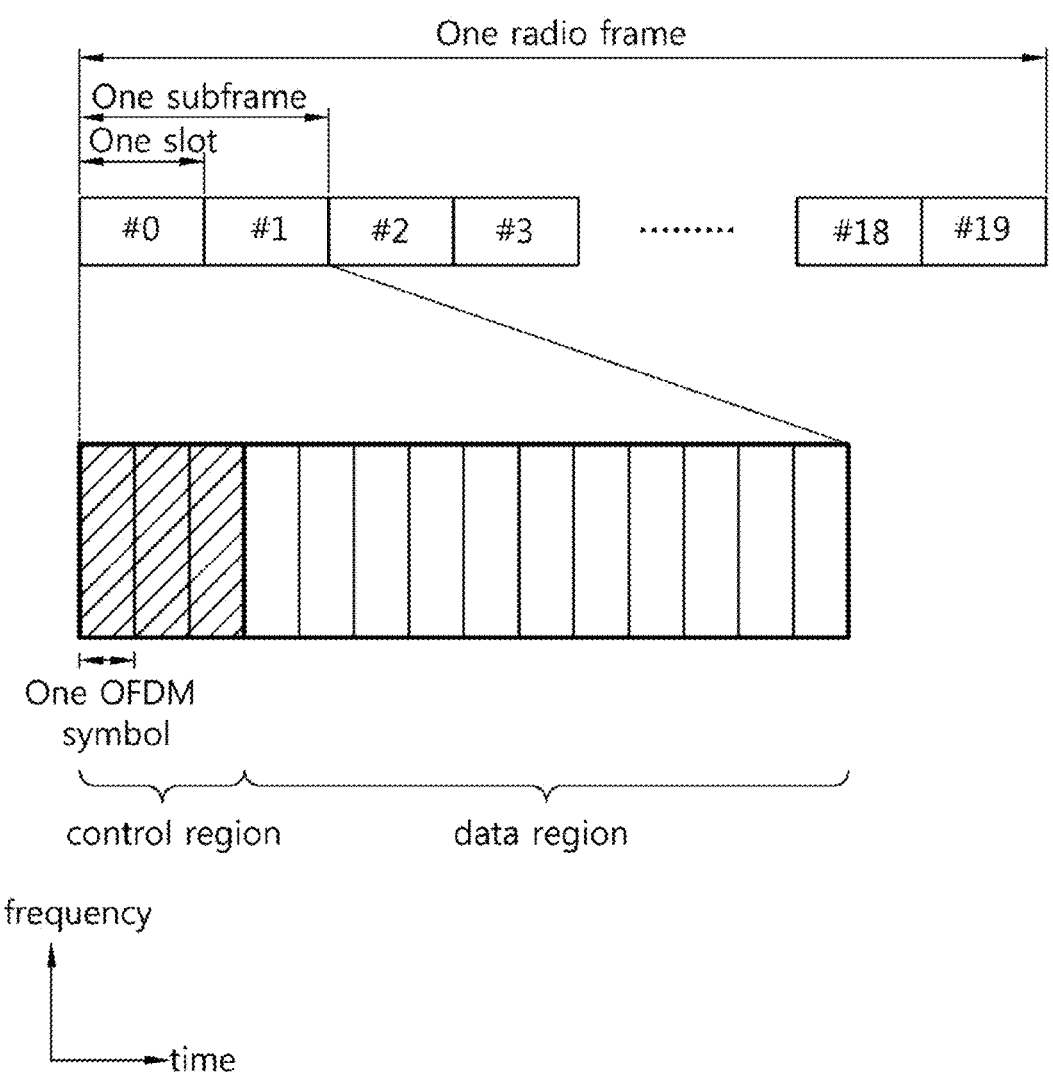
FIG. 5 illustrates the architecture of a downlink subframe.

FIG. 5 illustrates the architecture of a downlink subframe.

For this, 3GPP TS 36.211 V10.4.0 (2011-12) "Evolved Universal Terrestrial Radio Access (E-UTRA); Physical Channels and Modulation (Release 10)", Ch. 4 may be referenced.

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. OFDM symbol is merely to represent one symbol period in the time domain since 3GPP LTE adopts OFDMA (orthogonal frequency division multiple access) for downlink (DL), and the multiple access scheme or name is not limited thereto. For example, the OFDM symbol may be referred to as SC-FDMA (single carrier-frequency division multiple access) symbol or symbol period.

Here, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

Resource block (RB) is a unit for resource allocation and includes a plurality of sub-carriers in one slot. For example, if one slot includes seven OFDM symbols in the time domain and the resource block includes 12 sub-carriers in the frequency domain, one resource block may include 7×12 resource elements (REs).

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

According to 3GPP TS 36.211 V10.4.0, the uplink channels include a PUSCH, a PUCCH, an SRS (Sounding Reference Signal), and a PRACH (physical random access channel).

Figure 6:
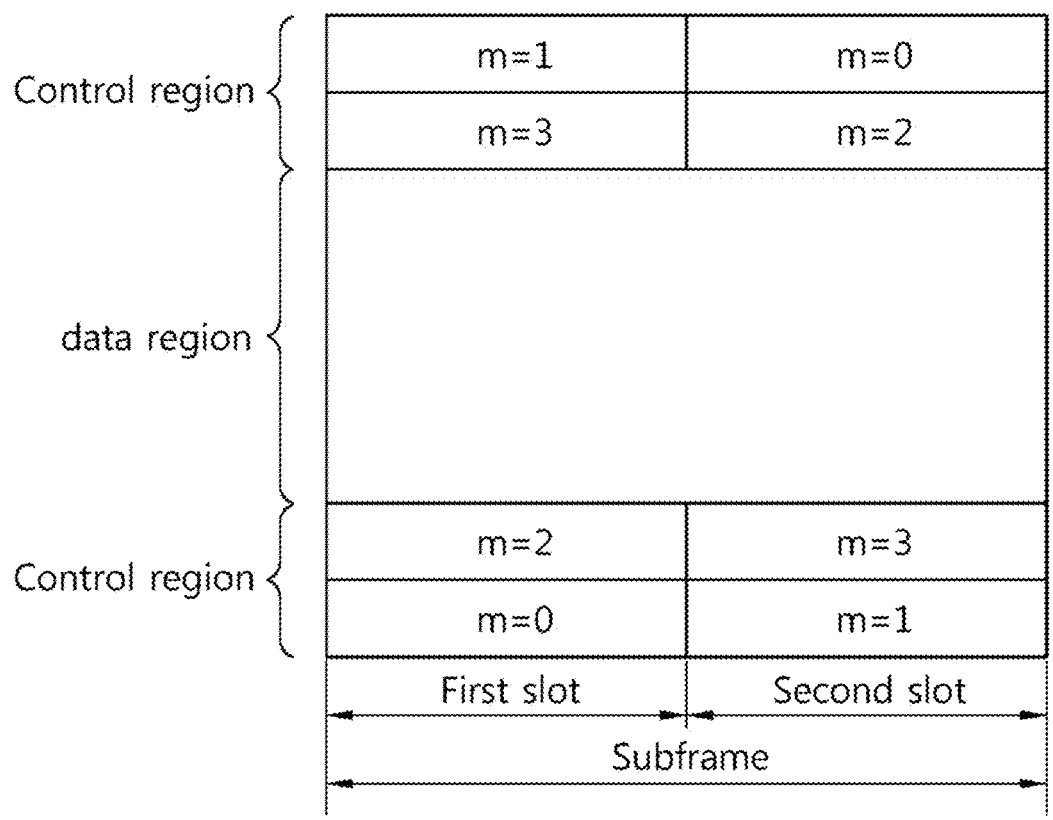
FIG. 6 illustrates the architecture of an uplink subframe in 3GPP LTE.

FIG. 6 illustrates the architecture of an uplink sub-frame in 3GPP LTE.

Referring to FIG. 6, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary. The terminal may obtain a frequency diversity gain by transmitting uplink control information through different sub-carriers over time.

Figure 7:
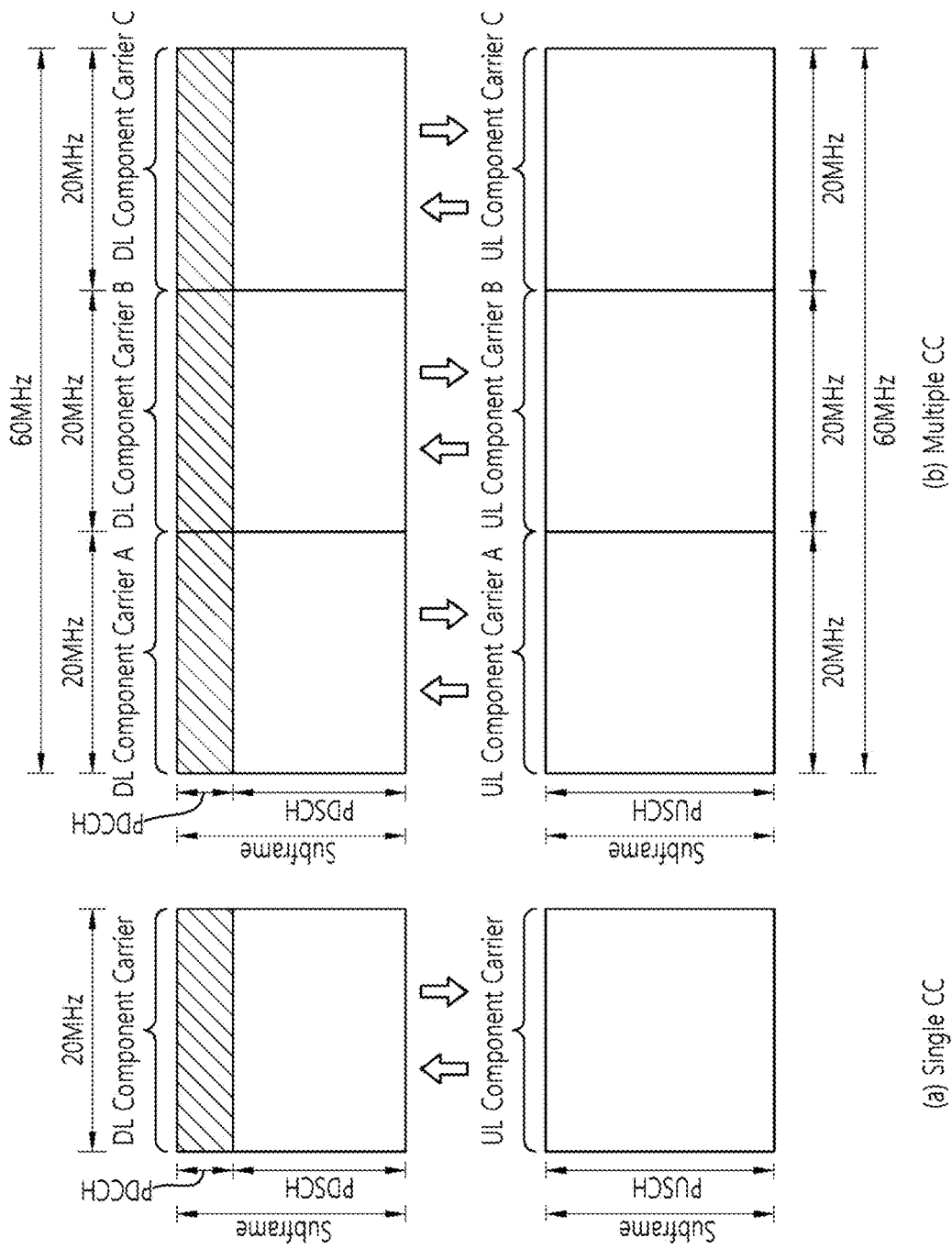
FIG. 7 illustrates a comparative example between the existing single carrier system and a carrier aggregation system.

FIG. 7 illustrates an example of comparison between a single carrier system and a carrier aggregation system.

Referring to FIG. 7(a), a typical FDD wireless communication system supports one carrier for uplink and downlink. In this case, the carrier may have various bandwidths, but only one carrier is assigned to the user equipment.

In other words, in the typical FDD wireless communication system, data transmission and reception is carried out through one downlink band and one uplink band corresponding thereto. The bit stream and the user equipment transmit and receive control information and/or data scheduled for each sub-frame. The data is transmitted/received through the data region configured in the uplink/downlink sub-frame, and the control information is transmitted/received through the control region configured in the uplink/downlink sub-frame. For this, the uplink/downlink sub-frame carries signals through various physical channels. Although the description in connection with FIG. 7 primarily focuses on the FDD scheme for ease of description, the foregoing may be applicable to the TDD scheme by separating the radio frame for uplink/downlink in the time domain.

As shown in FIG. 7(a), data transmission/reception performed through one downlink band and one uplink band corresponding to the downlink band is referred to as a single carrier system.

Such single carrier system may correspond to an example of communication in the LTE system. Such 3GPP LTE system may have an uplink bandwidth and a downlink bandwidth that differ from each other, but supports up to 20 MHz.

Meanwhile, a high data transmission rate is demanded. The most fundamental and stable solution to this is to increase bandwidth.

However, the frequency resources are presently saturated, and various technologies are partially being in use in a wide range of frequency band. For such reason, as a method for securing a broad bandwidth to satisfy the demand for higher data transmission rate, each scattered band may be designed to meet basic requirements for being able to operate an independent system, and carrier aggregation (CA) whose concept is to bundle up multiple bands to a single system has been introduced.

That is, the carrier aggregation (CA) system means a system that constitutes a broadband by gathering one or more carriers each of which has a bandwidth narrower than the targeted broadband when supporting a broadband in the wireless communication system.

Such carrier aggregation (CA) technology is also adopted in the LTE-advanced (hereinafter, 'LTE-A'). The carrier aggregation (CA) system may also be referred to as a multiple-carrier system or bandwidth aggregation system.

In the carrier aggregation (CA) system, a user equipment may simultaneously transmit or receive one or more carriers depending on its capabilities. That is, in the carrier aggregation (CA) system, a plurality of component carriers (CCs) may be assigned to a user equipment. As used herein, the term "component carrier" refers to a carrier used in a carrier aggregation system and may be abbreviated to a carrier. Further, the term "component carrier" may mean a frequency block for carrier aggregation or a center frequency of a frequency block in the context and they may be interchangeably used.

FIG. 7(b) may correspond to a communication example in an LTE-A system.

Referring to FIG. 7(b), in case, e.g., three 20 MHz component carriers are assigned to each of uplink and downlink, the user equipment may be supported with a 60 MHz bandwidth. Or, for example, if five CCs are assigned as granularity of the unit of carrier having a 20 MHz bandwidth, up to 100 MHz may be supported. FIG. 7(b) illustrates an example in which the bandwidth of an uplink component carrier is the same as the bandwidth of a downlink component carrier for ease of description. However, the bandwidth of each component carrier may be determined independently. When aggregating one or more component carriers, a targeted component carrier may utilize the bandwidth used in the existing system for backward compatibility with the existing system. For example, in a 3GPP LTE system, bandwidths of 1.4 MHz, 3 MHz, 5 MHz, 10 MHz, 15 MHz and 20 MHz may be supported. Accordingly, the bandwidth of an uplink component carrier may be constituted like 5 MHz(UL CC0)+20 MHz(UL CC1)+20 MHz(UL CC2)+20 MHz(UL CC3)+5 MHz(UL CC4), for example. However, without consideration of backward compatibility, a new bandwidth may be defined rather the existing system bandwidth being used, to constitute a broadband.

FIG. 7(b) illustrates an example in which the number of uplink component carriers is symmetric with the number of downlink component carriers for ease of description. As such, when the number of uplink component carriers is the same as the number of downlink component carriers is denoted symmetric aggregation, and when the number of uplink component carriers is different from the number of downlink component carriers is denoted asymmetric aggregation.

The asymmetric carrier aggregation may occur due to a restriction on available frequency bands or may be artificially created by a network configuration. As an example, even when the entire system band comprises N CCs, the frequency band where a particular user equipment may perform reception may be limited to M (<N) CCs. Various parameters for carrier aggregation may be configured cell-specifically, UE group-specifically, or UE-specifically.

Meanwhile, carrier aggregation systems may be classified into contiguous carrier aggregation systems where each carrier is contiguous with another and non-contiguous carrier aggregation systems where each carrier is spaced apart from another. A guard band may be present between the carriers in the contiguous carrier aggregation system. Hereinafter, simply referring to a multi-carrier system or carrier aggregation system should be understood as including both when component carriers are contiguous and when component carriers are non-contiguous.

Meanwhile, the concept of cell as conventionally appreciated is varied by the carrier aggregation technology. In other words, according to the carrier aggregation technology, the term "cell" may mean a pair of a downlink frequency resource and an uplink frequency resource. Or, the cell may mean a combination of one downlink frequency resource and an optional uplink frequency resource.

In other words, according to the carrier aggregation technology, one DL CC or a pair of UL CC and DL CC may correspond to one cell. Or, one cell basically includes one DL CC and optionally includes a UL CC. Accordingly, a user equipment communicating with a bit stream through a plurality of DL CCs may be said to receive services from a plurality of serving cells. In this case, although downlink is constituted of a plurality of DL CCs, uplink may be used by only one CC. In such case, the user equipment may be said to receive services from a plurality of serving cells for downlink and to receive a service from only one serving cell for uplink.

Meanwhile, in order for packet data to be transmitted/received through a cell, configuration for a particular cell should be completed. Here, the term "configuration" means the state where system information necessary for data transmission/reception on a corresponding cell is completely received. For example, the configuration may include the overall process of receiving common physical layer parameters necessary for data transmission/reception, MAC (media access control) layer parameters, or parameters necessary for a particular operation in RRC layer. The configuration-completed cell is in the state where packet transmission/reception is possible simply when information indicating that packet data may be transmitted is received.

The configuration-completed cell may be left in activation or deactivation state. Here, the term "activation" refers to data transmission or reception being performed or being ready. The UE may monitor or receive a control channel (PDCCH) or data channel (PDSCH) of an activated cell in order to identify resources (which may be frequency or time) assigned thereto.

Transmission or reception with a deactivated cell is impossible, while measurement or transmission/reception of least information is possible. The user equipment may receive system information (SI) necessary for receiving packets from a deactivated cell. In contrast, the user equipment does not monitor or receive the control channel (PDCCH) and data channel (PDSCH) of deactivated cells to identify resources (which may be frequency or time) assigned thereto.

In accordance with carrier aggregation technology, thus, activation/deactivation of a component carrier may be the same in concept as activation/deactivation of a serving cell. For example, assuming that serving cell 1 comprises DL CC1, activation of serving cell 1 means activation of DL CC1. Assuming that serving cell 2 is configured so that DL CC2 is connected with UL CC2, activation of serving cell 2 means activation of DL CC2 and UL CC2. In that regard, each component carrier may correspond to a serving cell.

On the other hand, a change in the concept of serving cell as conventionally understood by the carrier aggregation technology leads to primary cells and secondary cells being separated from each other.

The primary cell refers to a cell operating in a primary frequency and means a cell where the user equipment performs an initial connection establishment procedure or connection re-establishment procedure with a bit stream or a cell designated so during the course of handover.

The secondary cell means a cell operating in a secondary frequency, and is configured once an RRC connection is established and is used to provide additional radio resources.

The PCC (primary component carrier) means a component carrier (CC) corresponding to the primary cell. The PCC means a CC where the user equipment initially achieves connection (or RRC connection) with the base station among various CCs. The PCC is a special CC that is in charge of connection (or RRC connection) for signaling regarding multiple CCs and that manages UE context that is connection information relating to the UE. Further, the PCC, in case the PCC achieves connection with the UE so that it is in RRC connected mode, always remains in activated state. The downlink component carrier corresponding to the primary cell is referred to as a downlink primary component carrier (DL PCC), and the uplink component carrier corresponding to the primary cell is referred to as an uplink primary component carrier (UL PCC).

The SCC (secondary component carrier) means a CC corresponding to the secondary cell. That is, the SCC is a CC assigned to the user equipment, which is not the PCC, and the SCC is an extended carrier for the user equipment to assign additional resources other than the PCC. The SCC may stay in activated state or deactivated state. The downlink component carrier corresponding to the secondary cell is referred to as a downlink secondary component carrier (DL SCC), and the uplink component carrier corresponding to the secondary cell is referred to as an uplink secondary component carrier (UL SCC).

The primary cell and the secondary cell have the following features.

First, the primary cell is used for transmission of a PUCCH. Second, the primary cell always remains activated while the secondary cell switches between activation/deactivation depending on particular conditions. Third, when the primary cell experiences radio link failure (hereinafter, "RLF"), the RRC reconnection is triggered. Fourth, the primary cell may be varied by a handover procedure that comes together with security key changing or an RACH (Random Access CHannel) procedure. Fifth, NAS (non-access stratum) information is received through the primary cell. Sixth, in the case of an FDD system, the primary cell is constituted of a pair of DL PCC and UL PCC. Seventh, a different component carrier may be set as the primary cell for each user equipment. Eighth, primary cells may be exchanged only by a handover, cell selection/cell reselection process. In adding a new secondary cell, RRC signaling may be used to transmit system information of the dedicated secondary cell.

As described above, the carrier aggregation system may support a plurality of component carriers (CCs), i.e., a plurality of serving cells, unlike the single carrier system.

Such carrier aggregation system may support cross-carrier scheduling. The cross-carrier scheduling is a scheduling method that allows for resource allocation of a PDSCH transmitted through other component carrier through a PDCCH transmitted through a particular component carrier and/or resource allocation of a PUSCH transmitted through other component carrier than the component carrier basically linked with the particular component carrier. That is, a PDCCH and a PDSCH may be transmitted through different downlink CCs, and a PUSCH may be transmitted through an uplink CC other than an uplink CC linked with a downlink CC through which a PDCCH including a UL grant is transmitted. As such, the cross-carrier scheduling-supportive system requires a carrier indicator indicating a DL CC/UL CC through which a PDSCH/PUSCH through which a PDCCH provides control information is transmitted. The field containing such carrier indicator is hereinafter referred to as a carrier indication field (CIF).

The carrier aggregation system supportive of cross-carrier scheduling may include a carrier indication field (CIF) in the conventional DCI (downlink control information) format. A cross-carrier scheduling-supportive system, e.g., an LTE-A system, adds a CIF to the existing DCI format (i.e., DCI format used in LTE), so that it may be extended with three bits, and it may reuse the existing coding scheme, resource allocation scheme (i.e., CCE-based resource mapping) for the PDCCH structure.

Figure 8:
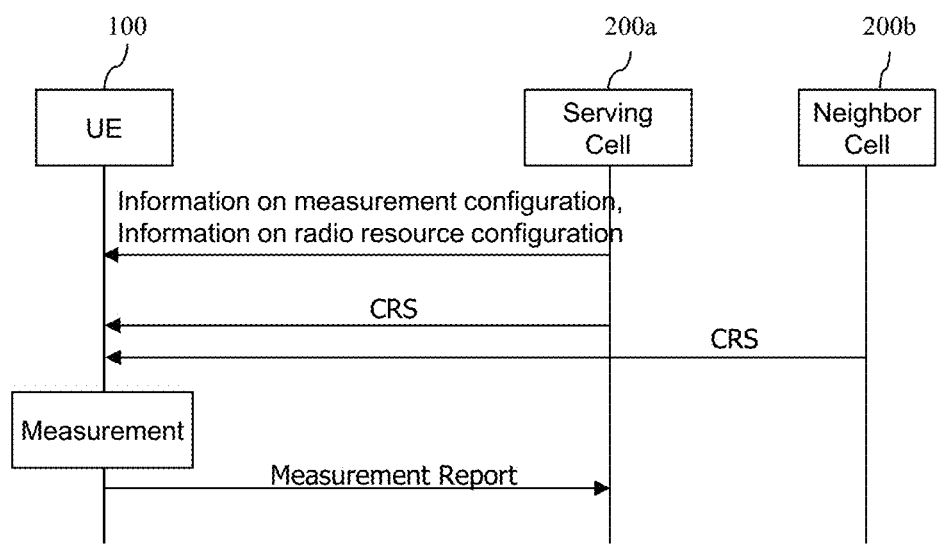
FIG. 8 illustrates a measurement and a measurement report.

FIG. 8 Illustrates a Measurement and a Measurement Report.

In wireless communication systems, it is indispensible to support mobility of the UE 100. Accordingly, the UE 100 continuously measures quality for serving cell that currently provides service and quality for a neighbor cell. The UE 100 reports the measurement result to a network on an appropriate time, and the network provides an optimal mobility to the UE through handover, and so on. Commonly, the measurement of such an object is called a radio resource management (RRM) measurement.

As we can know with reference to FIG. 8, if each of the serving cell 200*a* and the neighbor cell 200*b* transmit a cell-specific reference signal (CRS) to the UE 100, the UE 100 performs measurement through the CRS, and transmits the measurement result to the serving cell 200*a*.

In this time, the UE 100 may perform the measurement in the following three methods.

1) RSRP (reference signal received power): This represents an average reception power of all REs that carry the CRS which is transmitted through the whole bands. In this time, instead of the CRS, an average reception power of all REs that carry the CSI RS may also be measured.

2) RSSI (received signal strength indicator): This represents a reception power which is measured through the whole bands. The RSSI includes all of signal, interference and thermal noise.

3) RSRQ (reference symbol received quality): This represents a CQI, and may be determined as the RSRP/RSSI according to a measured bandwidth or a subband. That is, the RSRQ signifies a signal-to-noise interference ratio (SINR). Since the RSRP is unable to provide a sufficient mobility, in handover or cell reselection procedure, the RSRQ may be used instead of the RSRP.

The RSRQ may be obtained by RSSI/RSSP.

Meanwhile, the UE 100 receives a measurement configuration information element (IE) from the serving cell 100*a* for the measurement. The message that includes the measurement configuration information element (IE) is called a measurement configuration message. Here, the measurement configuration information element (IE) may be received through a RRC connection reconfiguration message. If the measurement result satisfies a report condition in the measurement configuration information, the UE reports the measurement result to a base station. The message that includes the measurement result is called a measurement report message.

The measurement configuration IE may include measurement object information. The measurement object information is information of an object that is going to perform a measurement by the UE. The measurement object includes at least one of an intra-frequency measurement object which is an object of intra-cell measurement, an inter-frequency measurement object which is an object of inter-cell measurement and an inter-RAT measurement object which is an object of inter-RAT measurement. For example, the intra-cell measurement object indicates a neighbor cell that has a frequency band which is identical to that of a serving cell, the inter-cell measurement object indicates a neighbor cell that has a frequency band which is different from that of a serving cell, and the inter-RAT measurement object indicates a neighbor cell of a RAT which is different from that of a serving cell.

In particular, the measurement configuration IE includes an information element (IE) as shown in the following table.

TABLE 1

MeasConfig ::=
-- Measurement objects
    measObjectToRemoveList
    measObjectToAddModList The measObjectToRemoveList indicating a list of measObject to be removed and measObjectToAddModList indicating a list to be newly added or modified are included in the measurement objects IE.

MeasObjectCDMA2000, MeasObjectEUTRA, MeasObjectGERAN, etc. are included in the measObject according to a communication technology.

Meanwhile, the MeasObjectEUTRA IE includes information applied for the purpose of an intra-frequency or inter-frequency for E-UTRA cell measurement. The MeasObjectEUTRA IE is as shown in the following table.

TABLE 2

1) MeasObjectEUTRA
   - neighCellConfig
   -   measSubframePatternConfigNeigh-r10
2) MeasSubframePatternConfigNeigh-r10
     measSubframePatternNeigh-r10
     measSubframeCellList-r10

The MeasObjectEUTRA is more specifically described as follows.

TABLE 3

Description of MeasObjectEUTRA field carrierFreq
identifies an E-UTRA carrier frequency effective in the configuration.
neighCellConfig
indicates configuration information of a neighbor cell.
measCycleSCell TABLE 3-continued Description of MeasObjectEUTRA field Parameter: $T_{measure\_scc}$
is used when a secondary cell (SCell) operates at a frequency indicated in the measObject and is in a non-activated state.
measSubframeCellList
is a list of cells to which the measSubframePatternNeigh is applied.
If a cell is not included in the measSubframeCellList, a time domain measurement resource restriction pattern for all neighbor cells is applied to the UE.
measSubframePatternNeigh
is a time domain measurement resource restriction pattern applied in measuring RSRP and RSRQ of a neighbor cell on the carrier frequency indicated in the carrierFreq.

As described above, the MeasObjectEUTRA includes a configuration information of a neighbor cell (i.e., NeighCellConfig), a time domain measurement resource restriction pattern (i.e., measSubframePattern-Neigh) applied in measuring RSRP and RSRQ of the neighbor cell, and a cell list (i.e., measSubframeCellList) to which the pattern is applied.

Meanwhile, the UE 100 also receives a radio resource configuration information element (IE) as shown in the drawing.

The radio resource configuration dedicated IE is used to configure/modify/cancel radio bearers, to modify MAC configuration, etc. The radio resource configuration dedicated IE includes subframe pattern information. The subframe pattern information is information on a measurement resource restriction pattern on the time domain, for measuring RSRP and RSRQ of a primary cell (PCell).

The radio resource configuration dedicated IE includes fields as shown in the following table.

TABLE 4

- RadioResourceConfigDedicated
- measSubframePatternPCell-r10

TABLE 5

RadioResourceConfigDedicated field descriptions logicalChannelConfig
is used as a selection for indicating that the logical channel configuration for SRBs is clearly signaled or that the logical channel configuration is set to a default logical channel configuration for SRB1.
logicalChannelIdentity
is a logical channel identifier for identifying both uplink (UL) and downlink (DL)
mac-MainConfig
is a selection used to indicate that the mac-MainConfig is clearly signaled or that the mac-MainConfig is set to default main configuration.
measSubframePatternPCell
is a time domain measurement resource restriction pattern for measuring RSRP and RSRQ of a primary cell (PCell, i.e., serving cell).
physicalConfigDedicated
is default dedicated physical configuration.

As described above, measSubframePatternPCell or measSubframePattern-Serv indicating the time domain measurement resource restriction pattern for measuring the RSRP and RSRQ of the primary cell (PCell, i.e., serving cell) is included in the RadioResourceConfigDedicated field within the RRC reconfiguration message.

Figure 9:
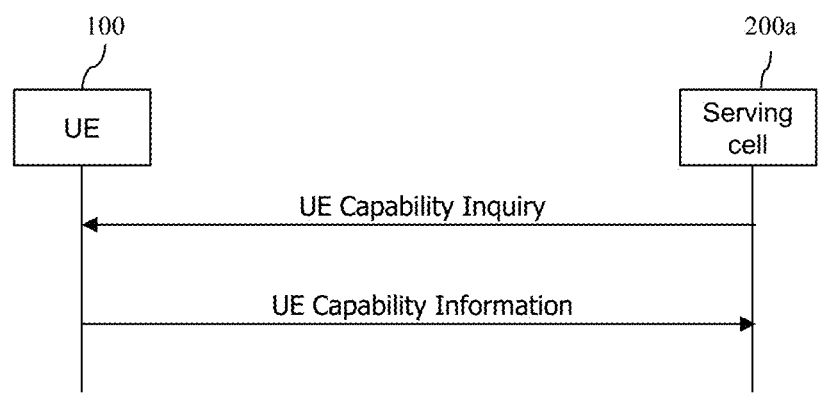
FIG. 9 illustrates a capability exchange procedure.

FIG. 9 Illustrates a Capability Exchange Procedure.

A procedure is shown for providing capability information for radio access of the UE 100 with a serving cell 200a.

As shown in FIG. 9, in case that the radio access capability of its own is changed, the UE 100 may request to start a procedure required for a higher layer.

Meanwhile, the serving cell 200a requests a UE capability inquiry to the UE 100 if it is needed or according to an instruction by the higher layer.

The UE 100 provides UE capability information according to the request.

Figure 10:
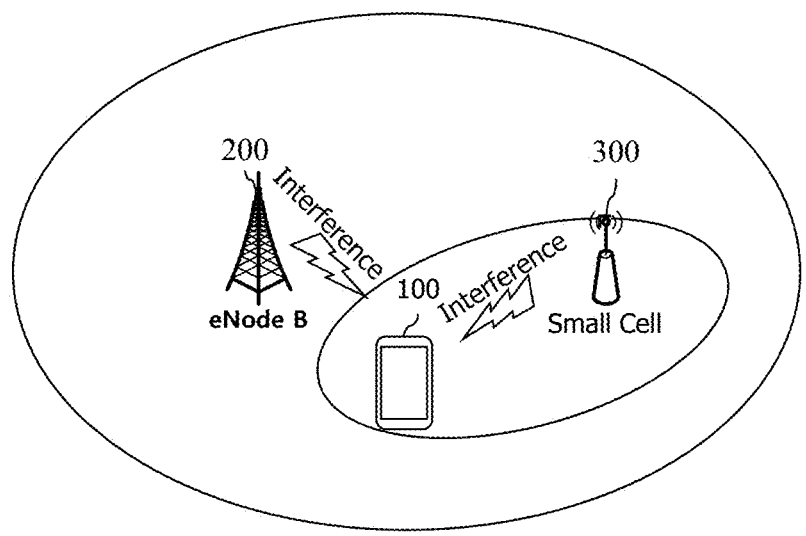
FIG. 10 illustrates a hetero-network that includes a macro cell and a small-scale cell.

FIG. 10 Illustrates a Hetero-Network that Includes a Macro Cell and a Small-Scale Cell.

In the communication standard of the next generation such as 3GPP LTE-A, there is a discussion about a heteronetwork in which small-scale cells that have a low transmission power in the existing macro cell coverage, such as a pico cell, a femto cell or a micro cell is existed with being overlapped.

Referring to FIG. 10, a macro cell may be overlapped with one or more micro cell. The service of macro cell is provided by a macro eNodeB (MeNB). In the present specification, the macro cell and the MeNB may be used with being mixed. A UE in connection with the macro cell may be referred to as a macro UE. The macro UE receives downlink signals from the MeNB and transmits uplink signals to the MeNB.

The small-scale cell is also referred to as a femto cell, a pico cell or a micro cell. The service of small-scale cell is provided by a pico eNodeB, a home eNodeB (HeNB), a relay node (RN), etc. For the convenience sake, the pico eNodeB, the home eNodeB (HeNB) and the relay node (RN) are collectively referred to as a HeNB. In this specification, the micro cell and the HeNB may be used with being mixed.

The small-scale cell may be divided into an open access (OA) cell and a closed subscriber group (CSG) cell according to accessibility. The OA cell signifies a cell in which a UE receives services anytime in case of need without separate access restriction. On the other hand, the CSG cell signifies a cell in which only a specific approved UE may receive services.

Since the macro cell and the small-scale cell are overlapped in the hetero-network, an inter-cell interference is a problem. As depicted, in case that a UE is located at a boundary between the macro cell and the small-scale cell, the downlink signal from the macro cell may act as interferences. Similarly, the downlink signal of the small-scale cell may also act as interferences.

As a detailed example, when the UE 100 that accesses the small-scale cell 300 is located at a boundary of the small-scale cell, the connection between the UE and the small-scale cell may be disconnected due to the interference from the macro cell 200. This signifies that the coverage of small-scale cell 300 becomes smaller than anticipated.

As another example, when the UE 100 that accesses the macro cell 200 is located in an area of the small-scale cell 300, the connection with the macro cell 200 may be disconnected due to the interference from the small-scale cell 300. This signifies that a radio shadow area occurs in the macro cell 200.

The most fundamental ways to solve the interference problem is to use different frequency between the heteronetworks. However, since a frequency is rare and expensive resource, the way of solution through frequency division is not welcomed by the service provider.

Accordingly, in 3GPP, it has been tried to solve the problem of inter-cell interference through the time division scheme.

According to this, in recent 3GPP, enhanced inter-cell interference coordination (eICIC) has been actively researched as a method of interference cooperation.

The time division scheme introduced in LTE Release-10 is called the enhanced inter-cell interference coordination (enhanced ICIC) as a meaning that it is an evolution in comparison with the existing frequency division scheme. In the scheme, it is defined that each cell that causes interference is referred to as an aggressor cell or a primary cell, and the cell that receives interference is referred to as a victim cell and a secondary cell. The aggressor cell or the primary cell stops data transmission in a specific subframe, thereby enabling a UE to maintain access with the victim cell or the secondary cell in the corresponding subframe. That is, in case that hetero-cells coexist, in this scheme, a cell stops transmission of signal for a while for a UE that receives significantly serious interference in a region, thereby not transmitting interference signal.

Meanwhile, the specific subframe in which the data transmission is stopped is called almost blank subframe (ABS), and in the subframe that corresponds to the ABS, any data is not transmitted except indispensible control information. The indispensible control information is, for example, a cell-specific reference signal (CRS). In current 3GPP LTE/LTE-A standard, the CRS is existed in $0^{th}$, $4^{th}$, $7^{th}$ and $11^{th}$ OFDM symbols in each subframe on time axis.

Figure 11:
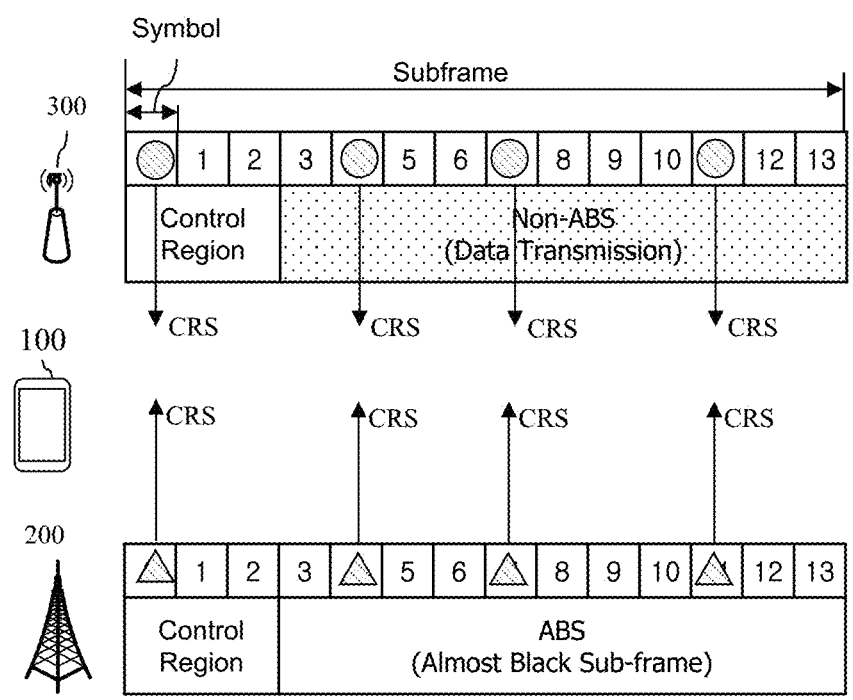
FIG. 11 illustrates enhanced inter-cell interference coordination (eICIC) for solving inter-base station interference.

FIG. 11 Illustrates Enhanced Inter-Cell Interference Coordination (eICIC) for Solving Inter-Base Station Interference.

Referring to FIG. 11, a macro cell, that is, eNodeB 200 operates the subframe which is shown as an ABS.

A small-scale cell 300 that corresponds to the pico cell performs data transmission in a data region of the corresponding subframe, and the CRS is transmitted on the symbols of numbers 1, 4, 7 and 11.

On the other hand, if the eICIC is applied to a macro cell, that is, the eNodeB 200, the corresponding subframe is operated according to the ABS, and thus, no data may be transmitted in a data region.

As described above, there may be a way to add an interference removing function to the UE 100 in addition to a way to solve the inter-cell interference problem through the eICIC method. Hereinafter, a method of adding the interference removing function will be described.

Figure 12:
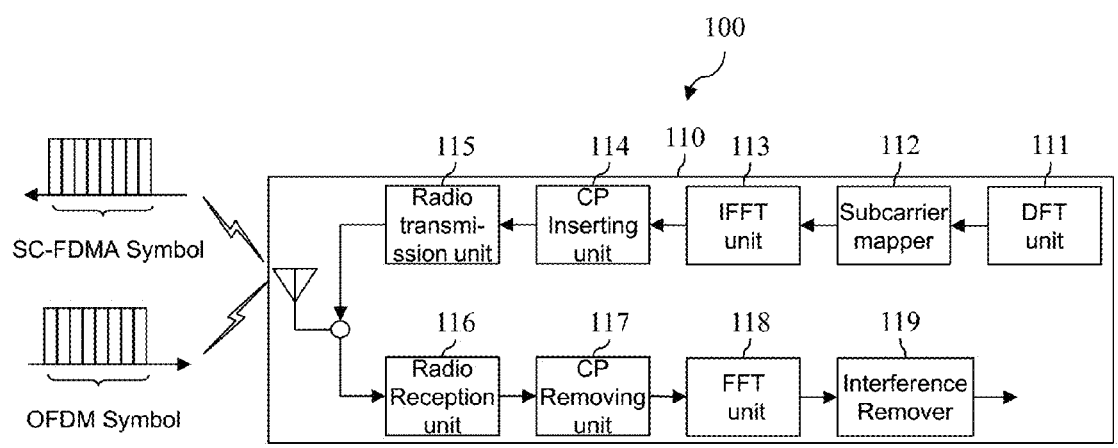
FIG. 12 is a block diagram illustrating a structure of a UE according to an aspect of the present specification.

FIG. 12 is a Block Diagram Illustrating a Structure of a UE According to an Aspect of the Present Specification.

In the long-term evolution (LTE) or LTE-A, an orthogonal frequency division multiplexing (OFDM) is used in downlink, but a single-carrier (SC)-FDMA (similar to OFDM) is used in uplink.

FDMA may be said to be DFT-s OFDM (DFT-spread OFDM). When using the SC-FDMA transmission scheme, the non-linear distortion of power amplifier may be avoided, thus allowing power consumption-limited user equipment to enjoy increased transmission power efficiency. Accordingly, user throughput may be increased.

SC-FDMA is similar to OFDM in that SC-FDMA also employs FFT (Fast Fourier Transform) and IFFT (Inverse-FFT). However, the problem with the existing OFDM transmitters is that signals over each sub-carrier on frequency axis are converted to signals on time axis by IFFT. That is, IFFT is in the form of performing the same parallel operation, thus causing an increase in PAPR (Peak to Average Power Ratio). To prevent such increase in PAPR, SC-FDMA, unlike OFDM, performs IFFT after DFT spreading. In other words, the transmission scheme of performing IFFT after DFT spreading is referred to as SC-FDMA. Thus, SC-FDMA is also called DFT spread OFDM (DFT-s-OFDM).

Such advantages of SC-FDMA led to being robust for multi-path channels thanks to similar structure to OFDM while enabling efficient use of power amplifier by fundamentally solving the problem of existing OFDM that OFDM causes increased PAPR due to IFFT operation.

Referring to FIG. 10, a UE 100 includes a RF unit 110. The RF unit 110 includes a transmission terminal, that is, a discrete Fourier transform (DFT) unit 111, a subcarrier mapper 112, an IFFT unit 113 and a CP insertion unit 114, and a radio transmission unit 115. The transmission terminal of the RF unit 110 further includes, for example, a scramble unit (not shown), a modulation mapper (not shown), a layer mapper (not shown) and a layer permutator (not shown), and those are arranged ahead of the DFT unit 111. That is, as previously described, in order to prevent an increase of PAPR, the transmission terminal of the RF unit 110 has the information gone through the DFT 111 before signals mapped to a subcarrier. The signal that is spread (or precoded in the same meaning) by the DFT 111 is mapped to a subcarrier through a subcarrier mapper 112, and after that, made into a signal on the time axis passing through an inverse fast Fourier transform (IFFT) unit again.

That is, due to the correlation among the DFT unit 111, the subcarrier mapper 112 and the IFFT unit 113, peak-to-average power ratio (PAPR) of later time domain signal of the IFFT unit 113 is not significantly increased in the SC-FDMA, different from the case of the OFDM, and accordingly, it is beneficial in the aspect of transmission power efficiency. That is, in the SC-FDMA, the PAPR or cubic metric (CM) may be decreased.

The DFT unit 111 outputs complex-valued symbols by performing DFT for the input symbols. For example, when $N_{tx}$ symbols are inputted ($N_{tx}$ is natural numbers), the size of DFT is $N_{tx}$. The DFT unit 111 may be called a transform precoder. The subcarrier mapper 112 maps the complex-valued symbols to each subcarrier in the frequency domain. The complex-valued symbols may be mapped to the resource elements that correspond to the resource blocks allocated for data transmission. The subcarrier mapper 112 may be called a resource element mapper. The IFFT unit 113 outputs baseband signal for data which is a time domain signal by performing IFFT for the inputted symbol. The CP insertion unit 114 copies a part of a rear part of the baseband signal for data and inserts it into a front part of the baseband signal for data. The inter-symbol interference (ISI) and the inter-carrier interference (ICI) are prevented by inserting the CP, thereby orthogonality can be maintained even in multi-path channel.

Meanwhile, 3GPP is actively standardizing LTE-Advanced that is an advanced version of LTE and has adopted clustered DFT-s-OFDM scheme that permits non-contiguous resource allocation.

Clustered DFT-s OFDM transmission scheme is a modification of the conventional SC-FDMA transmission scheme, and is a method of mapping by dividing the data symbols that have passed through the precoder into a plurality of subblocks and separating them in the frequency domain. Some major features of the clustered DFT-s-OFDM scheme include enabling frequency-selective resource allocation so that the scheme may flexibly deal with a frequency selective fading environment.

In this case, the clustered DFT-s-OFDM scheme adopted as an uplink access scheme for LTE-advanced, unlike the conventional LTE uplink access scheme, i.e., SC-FDMA, permits non-contiguous resource allocation, so that uplink data transmitted may be split into several units of cluster.

In other words, while the LTE system is rendered to maintain single carrier characteristics in the case of uplink, the LTE-A system allows for non-contiguous allocation of DFT_precoded data on frequency axis or simultaneous transmission of PUSCH and PUCCH. In such case, the single carrier features are difficult to maintain.

On the other hand, the RF unit 110 may include a reception terminal, for example, a radio reception unit 116, a CP removing unit 117, a FFT unit 118 and an interference removing unit 119, etc. The radio reception unit 116, the CP removing unit 117 and the FFT unit 118 of the reception terminal perform reverse functions of the radio transmission unit 115 the CP insertion unit 114 and the IFFT unit 113.

The interference removing unit 119 removes or alleviates the interference included in the signal received.

Figure 13:
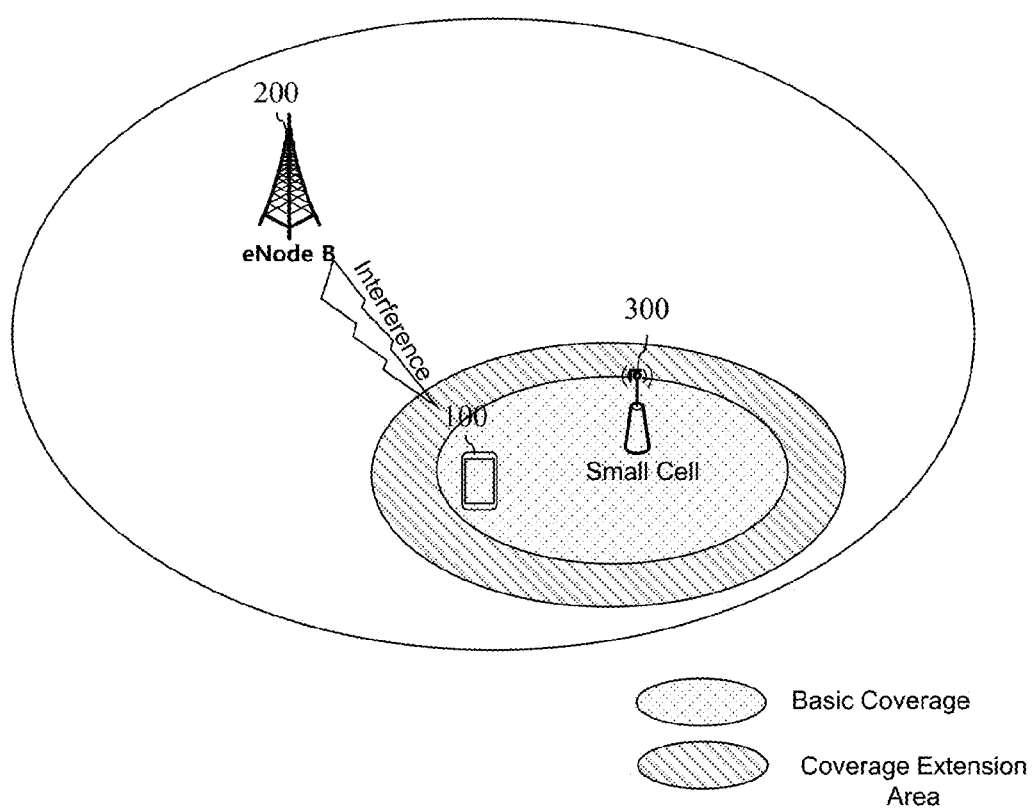
FIG. 13 illustrates a concept of expanding coverage of a small-scale cell according to an aspect of the present specification.

FIG. 13 Illustrates a Concept of Expanding Coverage of a Small-Scale Cell According to an Aspect of the Present Specification.

As depicted in FIG. 13, within the coverage of a BS (i.e., an eNodeB) 200 of a macro cell, a BS (i.e., a pico eNodeB) 300 of several small-scale cells may be installed. And if a UE that has been received service from the eNodeB 200 of the macro cell is existed in the coverage of the eNodeB 300 of the small-scale cell, the UE may handover to the eNodeB 300 of the small-scale cell, thereby obtaining the effect of offloading traffic of the eNodeB 200 of the macro cell.

Herein, the handover from the eNodeB 200 of the macro cell that corresponds to a serving BS to the eNodeB 300 of the small-scale cell that corresponds to a target BS is performed when the strength of reference signal of the target BS exceeds a specific threshold value based on the strength (RSRP, RSRQ) of the reference signal that the UE 100 received from the serving BS.

However, by putting into a certain means additionally or by improving capability of the UE 100, it can be implemented that the handover into the target BS may be performed even in case that the received reference signal strength of the target BS does not exceed the threshold value of the received reference signal strength of the serving BS, and consequently, such an operation gives birth to an effect of expanding the cell boundary or the cell radius of the BS (i.e., the pico eNodeB) 300 of the small-scale cell that corresponds to the target BS. In the drawing, the expanded coverage area which is wider than the basic coverage of the small-scale cell 300 is represented by deviant crease lines. Such an expanded coverage area may be referred to a cell range expansion (CRE).

Herein, when representing the threshold value used for normal handover as $S_{th\_conv}$, the area in which the CRE is available may be represented as an area satisfying the condition, $S_{th\_conv} \leq S_{received} \leq S_{th\_CRE}$.

Meanwhile, the reception strength for the reference signal from the small-scale cell 300 may be represented as the RSRP/RSRQ measured in the UE 100.

Hereinafter, as a method of interference coordination, when using an ICIC technique on a time axis is used, in case that a UE has a function of a CRS interference cancellation function of the interference removing unit 119, the UE operation that enables to effectively perform the RRM measurement (RSRP and RSRQ) will be described.

It will be described with reference to FIG. 14 in detail.

Figure 14:
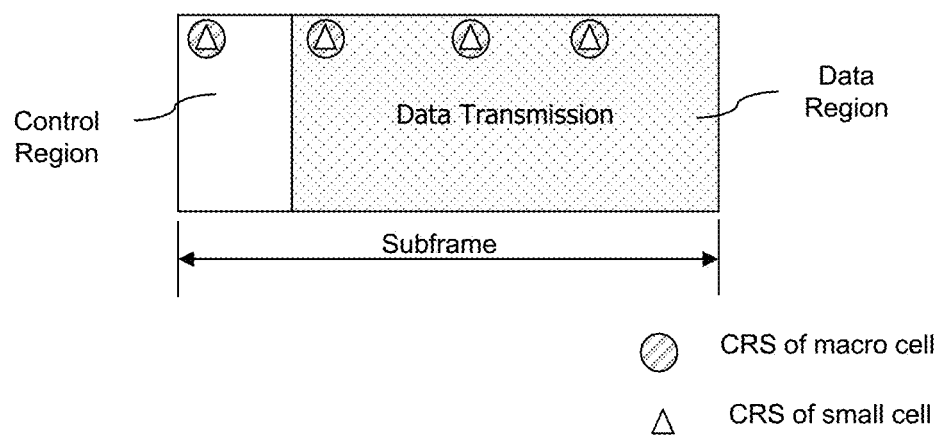
FIG. 14 illustrates interference between reference signals.

FIG. 14 Illustrates Interference Between Reference Signals.

Referring to FIG. 14, a CRS of a macro cell 200 and a CRS of a small-scale cell 300 act as interference to each other. Accordingly, in order for the UE 100 in the coverage extension area, that is, the CRE area to properly receive a CRS of the macro cell 200 or the small-scale cell 300, the CRS interference removing function of an interference removing unit 119 should be operated.

However, as the interference removing unit 119 operates the CRS interference removing function, depending on a situation, at least one of the RSRP, the RSRQ and the RSSI may be obtained as a value which is different from an actual value.

Accordingly, the present specification is to propose a method that the UE 100 in the coverage extension area, that is, the CRE area effectively measures the RSRP and the RSRQ for the macro cell 200 and the small-scale cell 300 and to propose a method that the UE 100 in a non-CRE area effectively measures the RSRP and the RSRQ for the macro cell 200 and the small-scale cell 300.

Figure 15A:
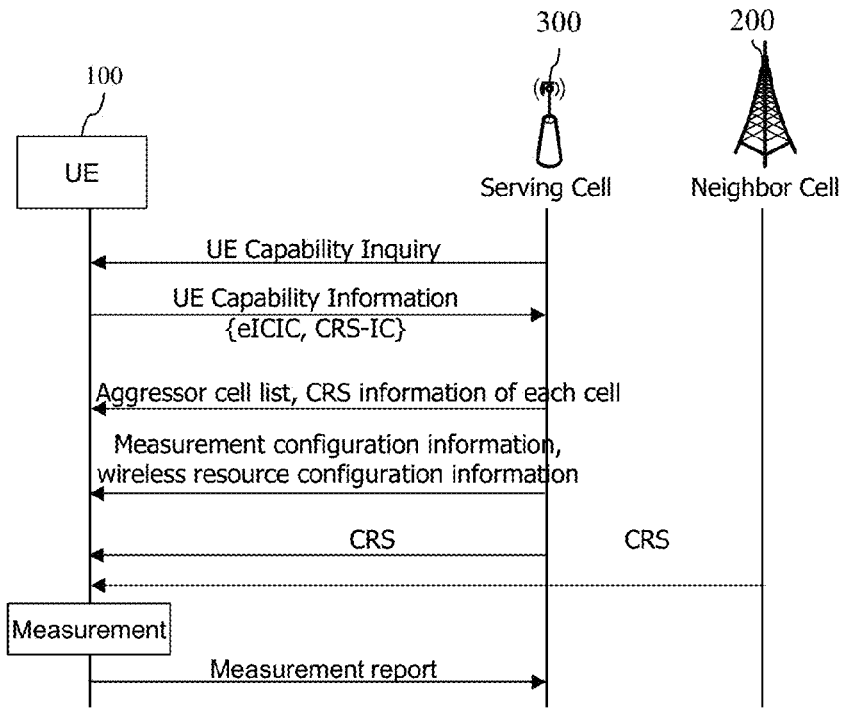
FIG. 15 illustrates an example proposed by the present specification.
Figure 15B:
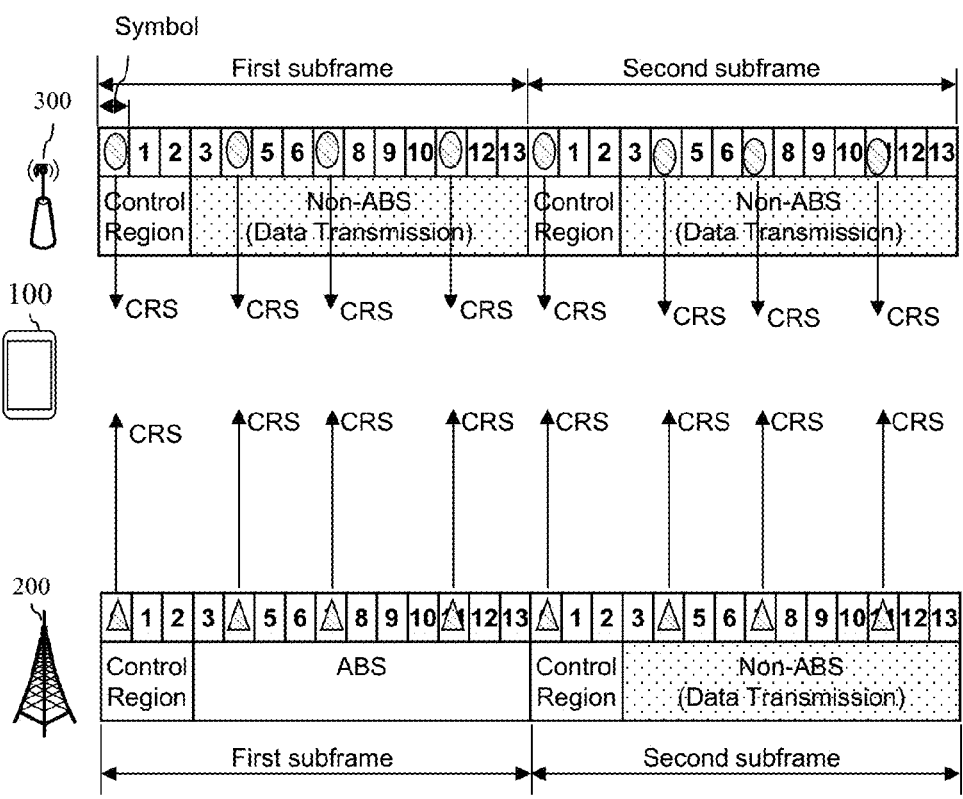

FIG. 15 Illustrates an Example Proposed by the Present Specification.

Referring to FIG. 15(*a*), a situation is shown that the small-scale cell 300 is a serving cell, and the macro cell 200 is a neighbor cell.

In this time, in response to the UE Capability inquiry, the UE 100 notifies that it has the eICIC function and the CRS interference cancellation (IC) function to the small-scale cell 300 that corresponds to a serving cell through the UE Capability information.

And the small-scale cell 300 that corresponds to the serving cell notifies a list for an aggressor cells and the CRS information of each cell to the UE 100.

In addition, the small-scale cell 300 that corresponds to the serving cell sends the measurement configuration IE and the wireless resource configuration IE to the UE 100.

Meanwhile, referring to FIG. 15(*b*), a first subframe is operated as a normal subframe which is not the ABS subframe by the small-scale cell 300 that corresponds to the serving cell, but is operated as the ABS subframe by the macro cell 200 that corresponds to the neighbor cell. On the other hand, a second subframe is operated as the ABS subframe by the small-scale cell 300 that corresponds to the serving cell, and is operated as a normal subframe which is not the ABS subframe by the macro cell 200 that corresponds to the neighbor cell.

In this time, according to the measSubframePatternPCell, the subframe designated for measuring the serving cell is the first subframe, and according to the measSubframePattern-Neigh, the subframe designated for measuring the neighbor cell is the second subframe.

As such, in case that the measSubframePatternPCell is configured for measuring the serving cell, and the eICIC function of the corresponding UE 100 is configured, according to an embodiment proposed by the present specification, the UE 100 may increase the performance of the RSRP and the RSRQ using the list of the received aggressor cells and the CRS information.

That is, when performing measurement for the small-scale cell 300 that corresponds to the serving cell in the first subframe which is designated by the measSubframePatternPCell, the UE 100 applies the interference cancellation (IC) for the CRS from the neighbor cell, thereby the interference due to the CRS from the neighbor cell may be removed, and accordingly, the RSRP and the RSRQ may be obtained with more higher performance.

In particular, in case of obtaining the RSRP for the small-scale cell 300 that corresponds to the serving cell on the first subframe which is designated by the measSubframe-PatternPCell, the UE 100 obtains the RSRP after removing the CRS of the neighbor cell.

Similarly, in case of obtaining the RSRQ for the small-scale cell 300 that corresponds to the serving cell on the first subframe, the UE 100 obtains it after removing the CRS of the neighbor cell. In this time, the RSSI which is required to obtain the RSRQ, regardless of whether the CRS of the neighbor cell that corresponds to an aggressor cell collides the CRS of the small-scale cell 300 that corresponding to the serving cell, obtains it after removing the CRS of the neighbor cell.

Meanwhile, in case of obtaining the RSRP for the macro cell 200 that corresponds to the neighbor cell on the second subframe which is designated by the measSubframePattern-Neigh, the UE 100 obtains the RSRP for the macro cell 200 after removing the CRS of the small-scale cell 300 that corresponds to the serving cell and the CRS of different neighbor cell.

However, when obtaining the RSRQ for the macro cell 200 that corresponds to the neighbor cell on the second subframe, the UE 100 obtains the RSRQ without using the CRS interference cancellation function. That is, the UE 100 does not apply the CRS interference cancellation (IC) function, and thus, obtains the RSSI without removing the CRS of the serving cell and another neighbor cell, and subsequently, obtains the RSRQ using the obtained RSSI and the obtained RSRP. The reason for doing such is because the second subframe designated by the measSubframePattern-Neigh is operated as a normal subframe, not the ABS subframe, by the macro cell 200, it is well reflect the actual RSSI to measure the RSSI without applying the CRS interference cancellation function.

In the meanwhile, performing the interference cancellation up to which level is close relation to the implementation of the UE 100. In the present invention, the level of interference cancellation is proposed as follows.

Aggressor RSRP−serving RSRP≥x [dB], herein, an example of x value may be 0 dB, but not exclude other values.

Here, the measSubframePatternPCell may be configured as a subset of the ABS subframe, and the measSubframe-PatternNeigh may be configured as a subset of a normal subframe, not the ABS subframe.

Figure 16A:
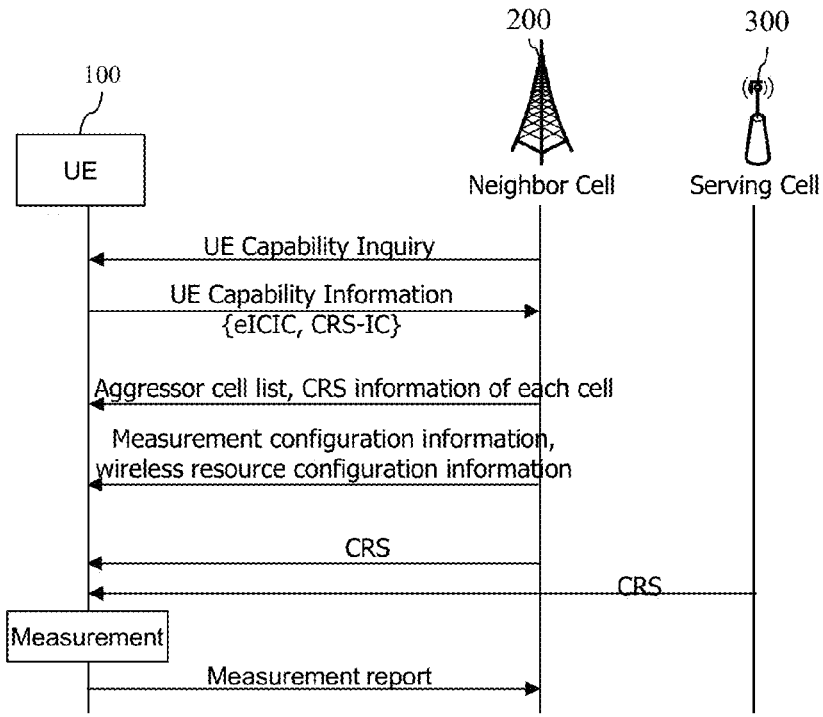
FIG. 16 illustrates another example proposed by the present specification.
Figure 16B:
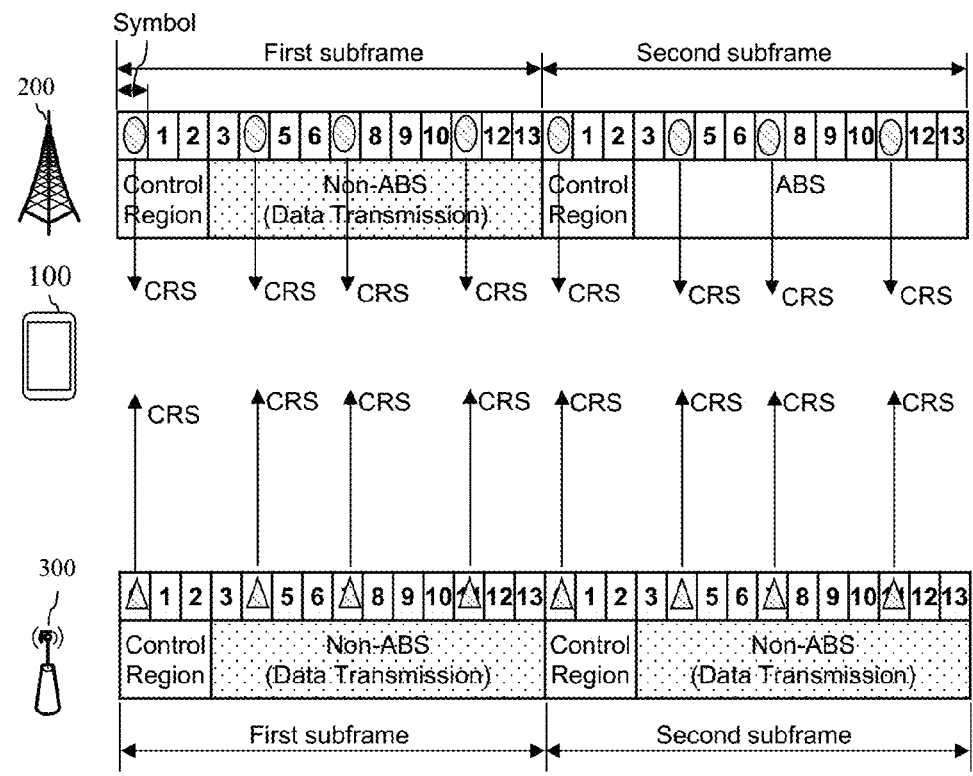

FIG. 16 Illustrates Another Example Proposed by the Present Specification.

Referring to FIG. 16(*a*), a situation is shown that the macro cell is a serving cell, and the 200 small-scale cell 300 is a neighbor cell. Hereinafter, the contents different from FIG. 15 will be mainly described, and the similar repeated contents will not be described.

Meanwhile, referring to FIG. 16(*b*), a first subframe is operated as a normal subframe which is not the ABS subframe by the macro cell 200, and also operated as a normal subframe which is not the ABS subframe by the small-scale cell that corresponds to the neighbor cell. On the other hand, a second subframe is operated as the ABS subframe by the macro cell 200 that corresponds to the serving cell, but is operated as a normal subframe, which is not the ABS subframe, by the small-scale cell 300 that corresponds to the neighbor cell.

In this time, according to the measSubframePatternPCell, the subframe designated for measuring the serving cell is the first subframe, and according to the measSubframePattern-Neigh, the subframe designated for measuring the neighbor cell is the second subframe.

As such, in case that the measSubframePatternPCell is configured for measuring the serving cell, and the eICIC function of the corresponding UE 100 is configured, according to another embodiment proposed by the present specification, the UE 100 may increase the performance of the RSRP and the RSRQ using the list of the received aggressor cells and the CRS information.

That is, when performing measurement for the macro cell 200 that corresponds to the serving cell in the first subframe which is designated by the measSubframePatternPCell, the UE 100 applies the interference cancellation (IC) for the CRS from the neighbor cell, thereby the interference due to the CRS from the neighbor cell may be removed, and accordingly, the RSRP and the RSRQ may be obtained with more higher performance.

In particular, in case of obtaining the RSRP for the macro cell 200 that corresponds to the serving cell on the first subframe which is designated by the measSubframePattern-PCell, the UE 100 obtains the RSRP after removing the CRS of the neighbor cell.

On the other hand, when obtaining the RSRQ for the macro cell 200 that corresponds to the serving cell on the first subframe, the UE 100 obtains the RSRQ without using the CRS interference cancellation function. That is, the UE 100 does not apply the CRS interference cancellation (IC) function, and thus, obtains the RSSI without removing the CRS of another neighbor cell, and subsequently, obtains the RSRQ using the obtained RSSI and the obtained RSRP. The reason for doing such is because the first subframe designated by the measSubframePatternPCell is operated as a normal subframe, not the ABS subframe, by the macro cell 200, it is well reflect the actual RSSI to measure the RSSI without applying the CRS interference cancellation function.

Meanwhile, in case of obtaining the RSRP for the small-scale cell 300 that corresponds to the neighbor cell on the second subframe which is designated by the measSubframe-PatternNeigh, the UE 100 obtains the RSRP for the small-scale cell 300 after removing the CRS of the serving cell and another neighbor cell.

However, when obtaining the RSRQ for the macro cell 200 that corresponds to the neighbor cell on the second subframe, the UE 100 obtains the RSRQ without using the CRS interference cancellation function. That is, the UE 100 does not apply the CRS interference cancellation (IC) function, and thus, obtains the RSSI without removing the CRS of the serving cell and another neighbor cell, and subsequently, obtains the RSRQ using the obtained RSSI and the obtained RSRP. The reason for doing such is because it is well reflect the actual RSSI to measure the RSSI without applying the CRS interference cancellation function.

In the meanwhile, performing the interference cancellation up to which level is close relation to the implementation of the UE 100. In the present invention, the level of interference cancellation is proposed as follows.

serving RSRP−aggressor RSRP≥x [dB], herein, an example of x value may be 0 dB, but not exclude other values.

Here, the measSubframePatternPCell may be configured as a subset of a normal subframe, not the ABS subframe, and the measSubframePatternNeigh may be configured as a subset of the ABS subframe.

Meanwhile, for the effective measurement, it may be preferable to notify the list for the aggressor cells and the CRS information of each cell to the UE 100 in the CRE region, regardless of whether the serving cell is a macro cell or a small-scale cell.

In the meanwhile, the description by reference to FIG. 15 and FIG. 16 will be represented as a table below.

TABLE 6

| Serving cell: Small-scale cell | RSRP | Operating IC when measuring the RSRP for the small-scale cell |
|---|---|---|
| Neighbor cell: Macro cell | | Operating IC when measuring the RSRP for the macro cell |
| | RSRQ | Operating IC when measuring the RSSI for obtaining the RSRQ for the small-scale cell Not operating IC when measuring the RSSI for obtaining the RSRQ for the macro cell |
| Serving cell: Macro cell | RSRP | Operating IC when measuring the RSRP for the small-scale cell |
| Neighbor cell: Small-scale cell | | Operating IC when measuring the RSRP for the macro cell |
| | RSRQ | Not operating IC when measuring the RSSI for obtaining the RSRQ for the macro cell Operating IC when measuring the RSSI for obtaining the RSRQ for the small-scale cell |

As we can know from Table 6 above, no matter what the macro cell is a serving cell or a neighbor cell, it may be preferable not to operate the interference cancellation when measuring the RSSI for obtaining the RSRQ.

The embodiments described so far may be implemented through various means. For example, the embodiments of the present invention may be implemented by hardware, firmware, software or the combination thereof. In particular, this will be described with reference to FIG. 17.

Figure 17:
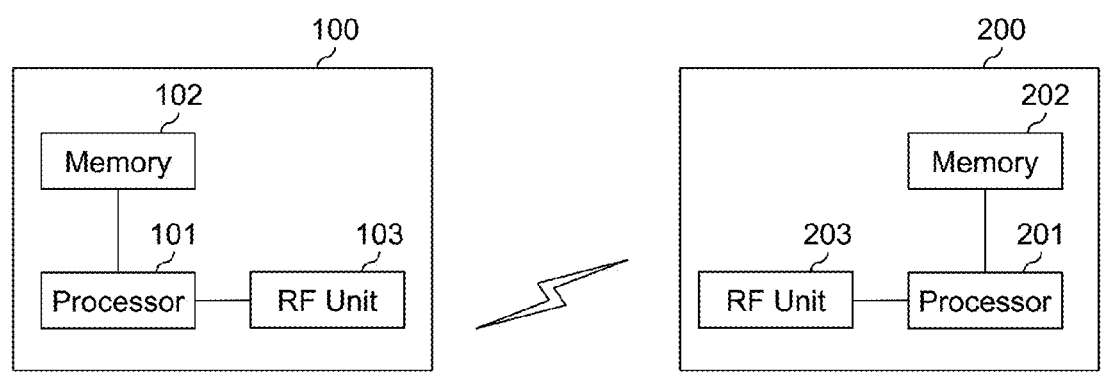
FIG. 17 is a block diagram illustrating a wireless communication system according to an embodiment of the present invention.

FIG. 17 is a Block Diagram Illustrating a Wireless Communication System According to an Embodiment of the Present Invention.

A BS 200 includes a processor 201, a memory 202, and an RF (radio frequency) unit 203. The memory 202 coupled to the processor 201 stores a variety of information for driving the processor 201. The RF unit 203 coupled to the processor 201 transmits and/or receives a radio signal. The processor 201 implements the proposed functions, procedure, and/or methods. In the aforementioned embodiment, an operation of the BS may be implemented by the processor 201.

A wireless device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods. In the aforementioned embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

INDUSTRIAL APPLICABILITY

The present invention may be used for a terminal, a base station or other equipment of wireless mobile communication systems.

What is claimed is:

1. A method for performing measurements in a wireless communication system in which a macro cell and a small cell coexist, the method performed by a terminal in a coverage extension area of the small cell and comprising:
   receiving information of a first subframe in which the measurement for the small cell is to be performed and information of a second subframe in which the measurement for the macro cell is to be performed;
   measuring a first reference signal received power (RSRP) of the small cell and a first received signal strength indicator (RSSI) of the small cell, by using an interference cancellation function on the first subframe if the interference cancellation function is configured;
   measuring a second RSRP of the macro cell on the second subframe by using the interference cancellation function; and
   measuring a second RSSI of the macro cell on the second subframe by not using the interference cancellation function.

2. The method of claim 1, wherein the interference cancellation function is an interference cancellation function for a cell-specific reference signal (CRS).

3. The method of claim 1, further comprising:
   receiving information of a neighbor cell that causes interference and CRS information of a neighbor cell.

4. The method of claim 3, wherein the performing the measurement by operating the interference cancellation function includes:
   removing interference due to the CRS from the corresponding neighbor cell by using the information of the neighbor cell and the CRS information of the neighbor cell.

5. The method of claim 3, wherein the information of the neighbor cell and the CRS information of the neighbor cell is received if the interference cancellation function is configured.

6. The method of claim 1, wherein the information of the first subframe and the information of the second subframe correspond to measSubframePatternPCell and measSubframePatternConfigNeigh, respectively.

7. The method of claim 1, wherein the small cell is a serving cell and the macro cell is a neighbor cell.

8. The method of claim 7, wherein the first subframe is operated as a normal subframe, not an ABS subframe, by the small cell that corresponds to the serving cell, or
   wherein the second subframe is operated as the normal subframe, not the ABS subframe by the small cell that corresponds to the serving cell, while the second subframe is operated as a normal subframe, not an ABS subframe, by also the macro cell that corresponds to the neighbor cell.

9. The method of claim 1, wherein the macro cell is the serving cell and the small cell is the neighbor cell.

10. The method of claim 9, wherein the first subframe is operated as a normal subframe, not an ABS subframe, by the macro cell that corresponds to the serving cell, while the subframe is operated as a normal subframe, not an ABS subframe, by also the small cell that corresponds to the neighbor cell, or wherein the second subframe is operated as an ABS subframe by the macro cell that corresponds to the serving cell, while the second subframe is operated as a normal subframe, not an ABS subframe, by the small cell that corresponds to the neighbor cell.

11. A terminal for performing measurements in a coverage extension area of a small cell in a wireless communication system in which a macro cell and a small cell coexist, the terminal comprising:

a RF unit configured to receive information of a first subframe in which the measurement for the small cell is to be performed and information of a second subframe in which the measurement for the macro cell is to be performed, wherein the RF unit includes an interference cancellation function; and a processor configured to control the RF unit and to;

measure a first reference signal received power (RSRP) of the small cell and a first received signal strength indicator (RSSI) of the small cell by using the interference cancellation function on the first subframe, measure a second RSRP of the macro cell on the second subframe by using the interference cancellation function, and measure a second RSSI of the macro cell on the second subframe by not using the interference cancellation function.

12. The terminal of claim 11, wherein the RF unit is further configured to receive information of a neighbor cell that causes interference and CRS information of a neighbor cell.

13. The terminal of claim 12, wherein during performing the measurement by operating the interference cancellation function, interference due to the CRS from the corresponding neighbor cell are removed by using the information of the neighbor cell and the CRS information of the neighbor cell.

* * * * *